(12) United States Patent
Shaefer et al.

(10) Patent No.: US 7,581,931 B2
(45) Date of Patent: Sep. 1, 2009

(54) GAS TURBINE BELLY BAND SEAL ANTI-ROTATION STRUCTURE

(75) Inventors: David M. Shaefer, Chuluota, FL (US); Brian D. Nereim, Winter Springs, FL (US)

(73) Assignee: Siemens Energy, Inc., Orlando, FL (US)

(*) Notice: Subject to any disclaimer, the term of this patent is extended or adjusted under 35 U.S.C. 154(b) by 452 days.

(21) Appl. No.: 11/581,169

(22) Filed: Oct. 13, 2006

(65) Prior Publication Data
US 2009/0148279 A1 Jun. 11, 2009

(51) Int. Cl.
*F01D 11/00* (2006.01)
(52) U.S. Cl. .................. 416/198 A; 277/421; 277/416; 416/220 R
(58) Field of Classification Search .................. 415/230, 415/231, 199.5; 416/198 R, 198 A, 200 R, 416/200 A, 201 R, 201 A, 220 R, 221; 277/416, 277/421
See application file for complete search history.

(56) References Cited

U.S. PATENT DOCUMENTS

| | | | |
|---|---|---|---|
| 4,826,395 A | 5/1989 | Groenendaal, Jr. | |
| 5,967,746 A | 10/1999 | Hagi et al. | |
| 6,089,827 A | 7/2000 | Ichiryu et al. | |
| 6,139,264 A * | 10/2000 | Schilling | 415/174.2 |
| 6,220,814 B1 | 4/2001 | Brushwood et al. | |
| 6,315,301 B1 | 11/2001 | Umemura et al. | |
| 6,464,463 B2 * | 10/2002 | Yvon Goga et al. | 416/215 |
| 7,470,113 B2 * | 12/2008 | Tran et al. | 416/198 A |

* cited by examiner

*Primary Examiner*—Edward Look
*Assistant Examiner*—Dwayne J White

(57) ABSTRACT

A seal strip assembly for use in a turbomachine having a plurality of stages including rotationally driven disks, and arms on opposed portions of adjoining disks to define paired arms with a space therebetween. The seal strip assembly includes a seal strip positioned in the space between the paired arms and having opposing edges for locating in slots formed in opposed faces of the paired arms. An anti-rotation block is provided, where a portion of the anti-rotation block is removably located in opposed openings formed in the paired arms and is engaged with the seal strip to resist movement of the seal strip relative to the paired arms. A detachable engagement member is detachably fastened to the anti-rotation block for maintaining the anti-rotation block in engagement with the seal strip.

20 Claims, 3 Drawing Sheets

GAS TURBINE BELLY BAND SEAL ANTI-ROTATION STRUCTURE

FIELD OF THE INVENTION

This invention relates in general to seals for multistage turbomachines and, more particularly, to an anti-rotation structure for a seal provided between adjoining disks in a multistage turbomachine.

BACKGROUND OF THE INVENTION

In various multistage turbomachines used for energy conversion, such as turbines, a fluid is used to produce rotational motion. In a gas turbine, for example, a gas is compressed through successive stages in a compressor and mixed with fuel in a combustor. The combination of gas and fuel is then ignited for generating combustion gases that are directed to turbine stages to produce the rotational motion. The turbine stages and compressor stages typically have stationary or non-rotary components, e.g., vane structures, that cooperate with rotatable components, e.g., rotor blades, for compressing and expanding the operational gases.

The rotor blades are typically mounted to disks that are supported for rotation on a rotor shaft. Annular arms extend from opposed portions of adjoining disks to define paired annular arms. A cooling air cavity is formed on an inner side of the paired annular arms between the disks of mutually adjacent stages, and a labyrinth seal may be provided on the inner circumferential surface of the stationary vane structures for cooperating with the annular arms to effect a gas seal between a path for the hot combustion gases and the cooling air cavity. The paired annular arms extending from opposed portions of adjoining disks define opposing end faces located in spaced relation to each other. Typically the opposing end faces may be provided with a slot for receiving a seal strip, known as a "belly band seal", which bridges the gap between the end faces to prevent cooling air flowing through the cooling air cavity from leaking into the path for the hot combustion gases. The seal strip may be formed of multiple segments, in the circumferential direction, that are interconnected at lapped or stepped ends, as is described in U.S. Pat. No. 6,315,301, which patent is incorporated herein by reference.

When the seal strip comprises plural segments positioned adjacent to each other, in the circumferential direction, the seal strips may shift circumferentially relative to each other. Shifting may cause one end of a seal strip segment to increase the overlap with an adjacent segment, while the opposite end of the seal strip segment will move out of engagement with an adjacent segment, opening a gap for passage of gases through the seal strip. In order to prevent rotation of the seal strip segments, the segments may be provided with pins or anti-rotation blocks to cooperate with an adjacent disk surface for holding the segments stationary relative to the disk.

For example, one known anti-rotation device comprises an anti-rotation block 2 that includes extensions 4, 5 positioned in engagement with notches formed in the seal strip 6 and located within an opening 7 in the end face of an annular arm 8 of the disk. The extensions 4, 5 are welded to the seal strip 6 to maintain the anti-rotation block 2 in position on the seal strip 6, see FIG. 5. Such an anti-rotation structure may experience cracking and failures at the weld locations. In particular, failure of the weld attaching the anti-rotation block to the seal strip may result in pieces of the seal strip becoming liberated and causing damage within the turbine. Further, applying this configuration of anti-rotation structure as a field repair requires a difficult field weld to be performed, making the quality of the repair difficult to control.

SUMMARY OF THE INVENTION

In accordance with one aspect of the invention, a seal strip assembly is provided for use in a turbomachine having a plurality of stages comprising rotationally driven disks, and arms on opposed portions of adjoining disks to define paired arms with a space therebetween, the paired arms comprising end faces including slots. The seal strip assembly comprises a seal strip for positioning in the space between the paired arms and having opposing edges for locating in respective slots of the paired arms. An anti-rotation block is also provided, where a portion of the anti-rotation block is formed for removably locating in an opening formed in at least one of the paired arms and is engaged with the seal strip to resist movement of the seal strip relative to the at least one arm. A detachable engagement member is detachably fastened to the anti-rotation block for maintaining the anti-rotation block in engagement with the seal strip.

In accordance with a further aspect of the invention, a seal strip assembly is provided in a turbomachine having a plurality of stages comprising rotationally driven disks, and arms on opposed portions of adjoining disks to define paired arms with a space therebetween, the paired arms comprising end faces including slots. The seal strip assembly comprises a seal strip located in the space between the paired arms and includes opposing edges located in respective slots of the paired arms. An anti-rotation block is also provided, where a portion of the anti-rotation block is removably located in opposed openings formed in the paired arms and is engaged with the seal strip to resist movement of the seal strip relative to the paired arms. A detachable engagement member is detachably fastened to the anti-rotation block for maintaining the anti-rotation block in engagement with the seal strip.

In accordance with another aspect of the invention, an anti-rotation structure is provided for use with a seal strip in a turbomachine. The anti-rotation structure comprises an anti-rotation block including a surface for engaging a first side of the seal strip and including a pair of spaced extensions extending from the surface for locating in a pair of respective notches formed in opposed edges of the seal strip. A detachable engagement member is also provided comprising an engagement block extending between the spaced extensions, the engagement block being removably mounted to the anti-rotation block.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
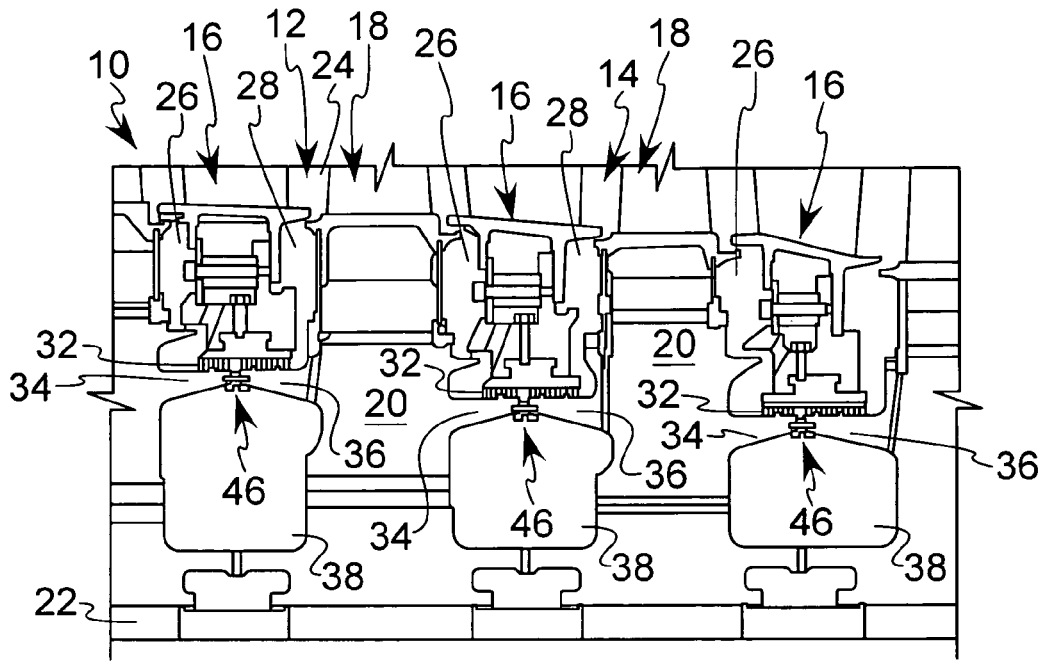
FIG. 1 is diagrammatic section view of a portion of a gas turbine engine.

Referring to FIG. 1, a portion of a turbine engine 10 is illustrated diagrammatically including adjoining stages 12, 14, each stage 12, 14 comprising an array of stationary vane assemblies 16 and an array of rotating blades 18, where the vane assemblies 16 and blades 18 are positioned circumferentially within the engine 10 with alternating arrays of vane assemblies 16 and blades 18 located in the axial direction of the turbine engine 10. The blades 18 are supported on rotor disks 20 secured to adjacent disks with spindle bolts 22. The vane assemblies 16 and blades 18 extend into an annular gas passage 24, and hot gases directed through the gas passage 24 flow past the vane assemblies 16 and blades 18 to remaining rotating elements.

Disk cavities 26, 28 are located radially inwardly from the gas passage 24. Purge air is preferably provided from cooling gas passing through internal passages in the vane assemblies 16 to the disk cavities 26, 28 to cool blades 18 and to provide a pressure to balance against the pressure of the hot gases in the gas passage 24. In addition, interstage seals comprising labyrinth seals 32 are supported at the radially inner side of the vane assemblies 16 and are engaged with surfaces defined on paired annular disk arms 34, 36 extending axially from opposed portions of adjoining disks 20. An annular cooling air cavity 38 is formed between the opposed portions of adjoining disks 20 on an inner side 80 of the paired annular disk arms 34, 36. The annular cooling air cavity 38 receives cooling air passing through disk passages to cool the disks 20.

Figure 2:
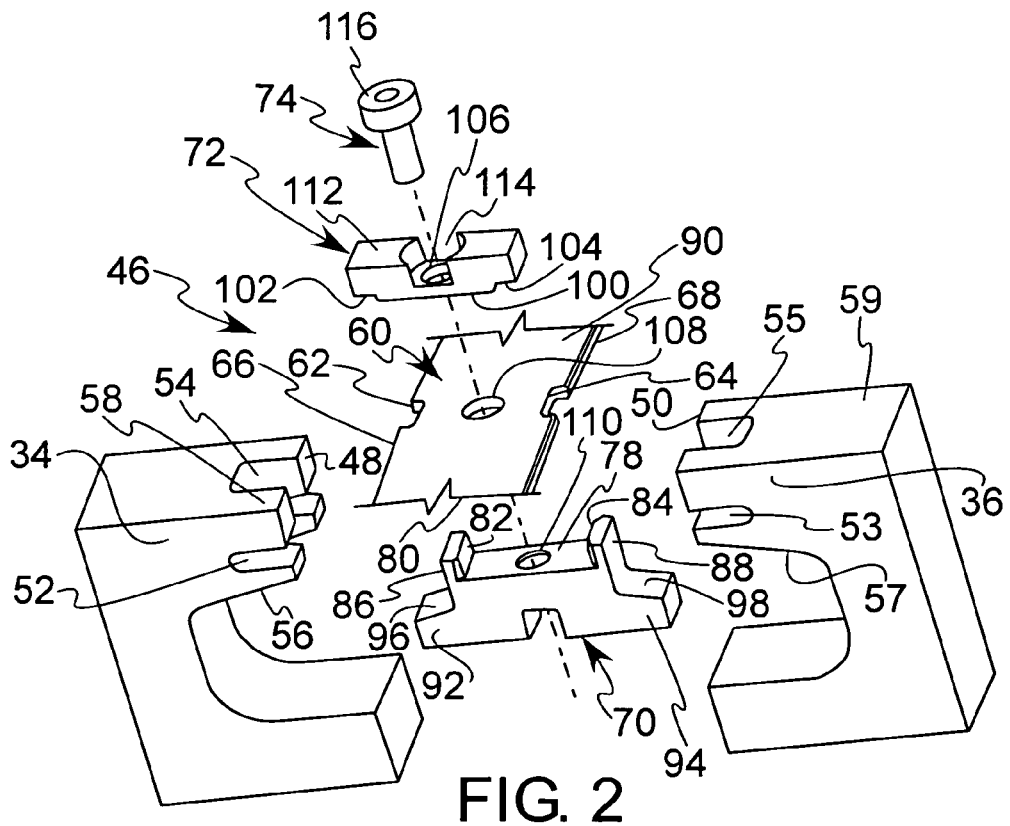
FIG. 2 is an exploded perspective view illustrating a seal strip assembly including an anti-rotation structure in accordance with the present invention.

Referring to FIG. 2, an exploded view showing a segment of two adjoining disks 20 is illustrated for the purpose of describing the seal strip assembly 46 of the present invention, it being understood that the disks 20 and associated disk arms 34, 36 define an annular structure extending the full circumference about the rotor centerline. The disk arms 34, 36 define respective opposed end faces 48, 50 located in closely spaced relation to each other. A circumferentially extending slot 52, 53 is formed in each end face 48, 50, and at least one radial opening 54, 55 extends from an inner surface 56, 57 to an outer surface 58, 59 of respective disk arms 34, 36, extending axially inwardly from the end faces 48, 50 and intersecting the slots 52, 53.

The seal strip assembly 46 includes a seal strip 60 forming a belly band seal. The seal strip 60 is positioned within the slots 52, 53 defined in the opposed end faces 48, 50. The seal strip 60 spans the gap between the end faces 48, 50 and defines a seal for preventing or substantially limiting flow of gases between the cooling air cavity 38 and the disk cavities 26, 28. The seal strip 60 preferably includes a pair of notches 62, 64 formed in opposed edges 66, 68 of the seal strip 60 for alignment with the radial openings 54, 55 formed in the disk arms 34, 36.

The seal strip assembly 46 further includes an anti-rotation structure comprising an anti-rotation block 70 and a detachable engagement member including an engagement block 72 and a fastener 74. The anti-rotation block 70 comprises an upper portion including an engagement surface 78 for engaging a first, radially inner surface or first side 80 of the seal strip 60. The engagement surface 78 extends in an axial direction a distance substantially equal to the distance between the notches 62, 64 in the seal strip 60, and is bounded on either axial end by radially extending walls 82, 84 defined on a pair of spaced extensions 86, 88. The extensions 86, 88 are dimensioned in the circumferential direction to fit within the notches 62, 64, and are dimensioned in the radial direction to include an end extending a predetermined distance above a radially outer surface or second side 90 of the seal strip 60, opposite the first side 80. The extensions 86, 88 are further dimensioned to fit within the radial openings 54, 55 in the disk arms 34, 36. Engagement of the extensions 86, 88 with the notches 62, 64 constrains the seal strip 60 to a predetermined position relative to the anti-rotation block 70, as well as relative to the disk arms 34, 36.

A lower portion of the anti-rotation block 70 includes axially extending legs 92, 94. The legs 92, 94 include respective outer surfaces 96, 98 for engaging the inner surfaces 56, 57 of the paired disk arms 34, 36. The legs 92, 94 locate the anti-rotation block 70 in the radial direction relative the paired disk arms 34, 36.

The engagement block 72 is dimensioned such that opposing ends or edge portions thereof may fit with the radial openings 54, 55. The engagement block 72 extends between the extensions 86, 88 of the anti-rotation block 70 and includes an engagement surface 100 for engaging the second side 90 of the seal strip 60 in the area between the notches 62, 64. Recessed areas 102, 104 are located at either axial end of the engagement block 72 and are dimensioned to receive the ends of the extensions 86, 88.

Figure 3:
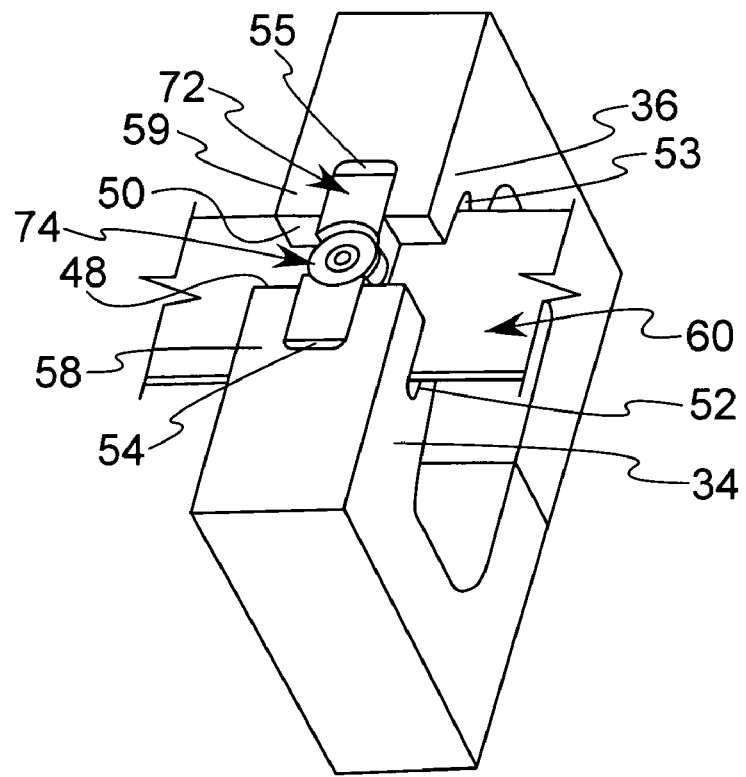
FIG. 3 is a perspective view of the seal strip assembly shown assembled in relation to a section of a pair adjoining disks.
Figure 4:
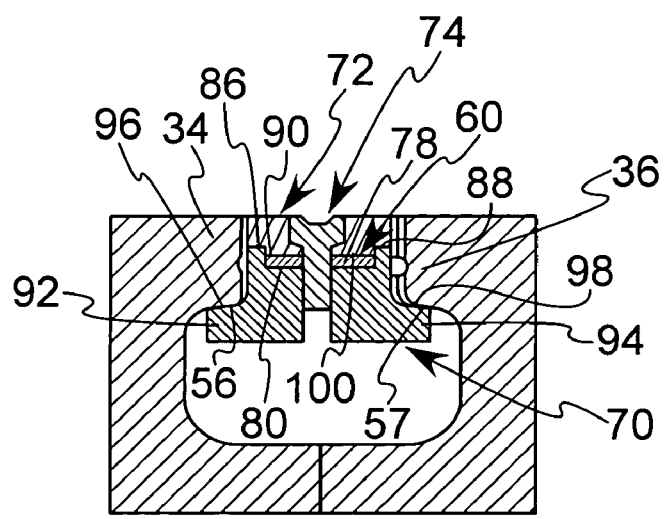
FIG. 4 is a cross-sectional view of the assembled seal strip assembly shown in FIG. 3.

Referring further to FIGS. 3 and 4, the engagement block 72 is removably mounted to the anti-rotation block 70, with the seal strip 60 sandwiched therebetween, by the fastener 74. The fastener 74 preferably comprises a threaded fastener, such as a screw or a bolt, extending through an aperture 106 in the engagement block 72, passing through a hole 108 in the seal strip 60, and threadably engaged in a threaded aperture 110 in the anti-rotation block 70. An outer surface 112 of the engagement block 72 may be provided with a recess 114 for receiving a head portion 116 of the fastener 74 whereby the top of the head portion 116 is recessed substantially flush with the outer surfaces 58, 59 of the disk arms 34, 36. It may be seen that the thickness of the engagement block 72 in the radial direction locates the outer surface 112 of the engagement block 72 substantially flush with the outer surfaces 58, 59 of the disk arms 34, 36, as may be best seen in FIG. 4.

In addition, it should be understood that, within the scope of the present invention, other detachable engagement structures, including other fasteners or connecting structure than threaded fasteners, may be used to removably retain the anti-rotation block 70 in association with the seal strip 60. Such alternative connecting structures may include, without limitation, removable or detachable clips, clamps, or other equivalent structures.

Figure 5:
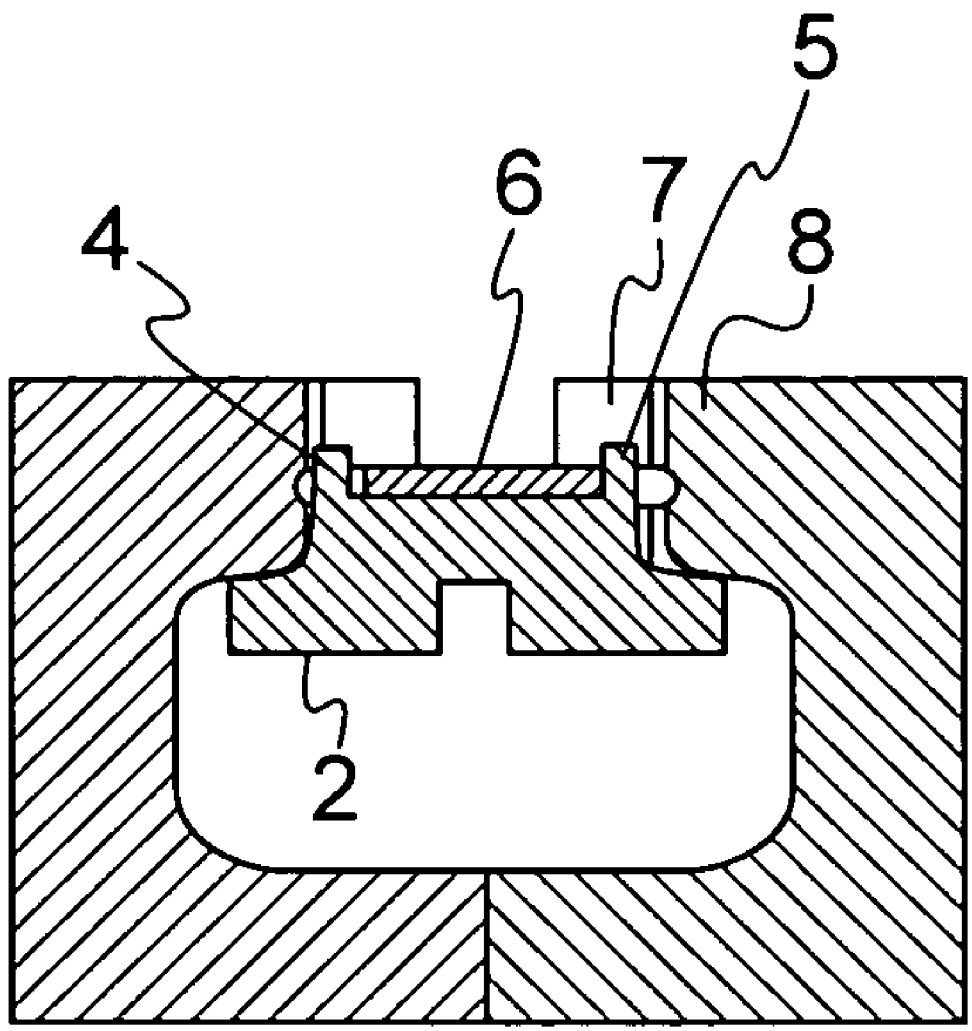
FIG. 5 is a cross-sectional view illustrating a prior art seal assembly including a welded anti-rotation block.

The present invention provides a structure that may be incorporated into existing gas turbine engines without requiring modification of the disk arms 34, 36 to incorporate the seal strip assembly 46 disclosed herein. In particular, the present seal strip assembly 46 is adapted to fit within the existing radial openings 54, 55 currently provided on turbine engine disk arms 34, 36 for receiving prior art anti-rotation blocks, such as is disclosed in FIG. 5.

In a typical application of the invention, the seal strip 60 may be provided as four separate seal strip segments having lapped ends (not shown) to form a continuous belly band seal about the circumference of the cooling air cavity 38. An anti-rotation structure may be provided at the mid-span of each of the seal strip segments to thereby locate each seal strip segment relative to adjacent seal strip segments.

Field repair of the seal strip 60 is typically performed by removing and replacing seal strips through an opening (not shown) formed in the inner surfaces 56, 57 of the arms 34, 36. The present invention permits accurate placement of the seal strip assembly 46 by providing a structure having tolerances that may be accurately machined in a shop or factory environment, prior to transport to the field. Further, the installation of the disclosed seal strip assembly 46 is simplified in that a weld connection utilized for the prior art installation is replaced by a removable fastener connection that facilitates manipulation in the field, and that permits disassembly of the seal strip assembly 46 if repositioning or removal of components of the assembly is required.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal strip assembly for use in a turbomachine having a plurality of stages comprising rotationally driven disks, and arms on opposed portions of adjoining disks to define paired arms with a space therebetween, said paired arms comprising end faces including slots, the seal strip assembly comprising:
    a seal strip for positioning in said space between said paired arms and having opposing edges for locating in respective slots of said paired arms;
    an anti-rotation block, a portion of said anti-rotation block being formed for removably locating in an opening formed in at least one of said paired arms and engaged with said seal strip to resist movement of said seal strip relative to said at least one arm; and
    a detachable engagement member detachably fastened to said anti-rotation block for maintaining said anti-rotation block in engagement with said seal strip.

2. The seal strip assembly of claim 1, wherein said anti-rotation block includes a surface in engagement with a first side of said seal strip and said detachable engagement member is located on a second, opposite side of said seal strip.

3. The seal strip assembly of claim 2, wherein said detachable engagement member includes at least one edge portion for locating in said opening of said at least one of said paired arms.

4. The seal strip assembly of claim 1, wherein said detachable engagement member comprises a fastener extending into engagement with said anti-rotation block.

5. The seal strip assembly of claim 4, wherein said fastener comprises a threaded fastener.

6. The seal strip assembly of claim 1, wherein said portion of said anti-rotation block comprises at least one extension located within a notch defined in one of said edges of said seal strip.

7. The seal strip assembly of claim 6, wherein said anti-rotation block comprises a pair of spaced extensions, each extension located in a notch defined in a respective edge of said seal strip.

8. The seal strip assembly of claim 7, wherein said detachable engagement member includes a pair of recessed areas for receiving respective ones of said spaced extensions.

9. In a turbomachine having a plurality of stages comprising rotationally driven disks, and arms on opposed portions of adjoining disks to define paired arms with a space therebetween, said paired arms comprising end faces including slots, a seal strip assembly comprising:
    a seal strip located in said space between said paired arms and having opposing edges located in respective slots of said paired arms;
    an anti-rotation block, a portion of said anti-rotation block being removably located in opposed openings formed in said paired arms and engaged with said seal strip to resist movement of said seal strip relative to said paired arms; and
    a detachable engagement member detachably fastened to said anti-rotation block for maintaining said anti-rotation block in engagement with said seal strip.

10. The seal strip assembly of claim 9, wherein said anti-rotation block includes a surface in engagement with a first side of said seal strip and said detachable engagement member is located on a second, opposite side of said seal strip.

11. The seal strip assembly of claim 9, wherein said detachable engagement member comprises an engagement block extending between said paired arms, said engagement block including edge portions for locating in said opposed openings of said paired arms.

12. The seal strip assembly of claim 9, wherein said detachable engagement member comprises a fastener extending through said seal strip into engagement with said anti-rotation block.

13. The seal strip assembly of claim 12, wherein said fastener comprises a threaded fastener.

14. The seal strip assembly of claim 9, wherein said portion of said anti-rotation block comprises a pair of spaced extensions, each extension located in a notch defined in a respective edge of said seal strip.

15. The seal strip assembly of claim 14, wherein said detachable engagement member includes a pair of recessed areas for receiving respective ones of said spaced extensions.

16. The seal strip assembly of claim 9, wherein said seal strip defines a seal between a cooling air cavity and a disk cavity in said turbomachine.

17. An anti-rotation structure for use with a seal strip in a turbomachine, said anti-rotation structure comprising:
    an anti-rotation block including a surface for engaging a first side of said seal strip and including a pair of spaced extensions extending from said surface for locating in a pair of respective notches formed in opposed edges of said seal strip; and
    a detachable engagement member comprising an engagement block extending between said spaced extensions, said engagement block being removably mounted to said anti-rotation block.

18. The anti-rotation structure of claim 17, wherein said engagement block includes a surface for engaging a second side of said seal strip, opposite said first side.

19. The anti-rotation structure of claim 17, including a removable fastener extending through said engagement block into said anti-rotation block.

20. The anti-rotation structure of claim 19, wherein said fastener comprises a threaded fastener.

\* \* \* \* \*